(12) United States Patent
Madnick et al.

(10) Patent No.: US 6,282,537 B1
(45) Date of Patent: Aug. 28, 2001

(54) QUERY AND RETRIEVING SEMI-STRUCTURED DATA FROM HETEROGENEOUS SOURCES BY TRANSLATING STRUCTURED QUERIES

(75) Inventors: Stuart E. Madnick, Brookline; Michael D. Siegel, Cambridge, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/286,852

(22) Filed: Apr. 6, 1999

Related U.S. Application Data

(63) Continuation of application No. 08/698,166, filed on Aug. 8, 1996, now Pat. No. 5,913,214, and a continuation-in-part of application No. 08/657,750, filed on May 30, 1996.

(51) Int. Cl.[7] .................................................. G06F 17/30
(52) U.S. Cl. ........................................ 707/4; 707/2; 707/3
(58) Field of Search ..................................... 707/4, 2, 3

(56) References Cited

U.S. PATENT DOCUMENTS

| | | | |
|---|---|---|---|
| 4,714,995 | 12/1987 | Materna et al. ...................... | 364/200 |
| 5,278,978 | 1/1994 | Demers et al. ...................... | 395/600 |
| 5,345,586 | 9/1994 | Hamala et al. ...................... | 695/650 |
| 5,416,917 | 5/1995 | Adair et al. .......................... | 395/500 |
| 5,506,984 | 4/1996 | Miller .................................. | 395/600 |
| 5,511,186 | 4/1996 | Carhard et al. ...................... | 395/600 |
| 5,550,971 | 8/1996 | Brunner et al. ..................... | 395/161 |
| 5,590,319 | 12/1996 | Cohen et al. ......................... | 395/604 |
| 5,596,744 | 1/1997 | Dao et al. ............................. | 395/610 |
| 5,600,831 | 2/1997 | Levy et al. ............................ | 395/602 |
| 5,634,053 | 5/1997 | Noble et al. .......................... | 395/604 |
| 5,737,592 | 4/1998 | Nguyen et al. ....................... | 395/604 |
| 5,740,421 | 4/1998 | Palmon ................................. | 395/604 |
| 5,826,258 | 10/1998 | Gupta et al. .............................. | 707/4 |
| 5,870,739 | * 2/1999 | Davis, III et al. ........................ | 707/4 |
| 5,873,079 | * 2/1999 | Davis, III et al. ........................ | 707/3 |
| 5,884,304 | * 3/1999 | Davis, III et al. ........................ | 707/4 |
| 5,913,214 | * 6/1999 | Madnick et al. ......................... | 707/10 |
| 5,953,716 | * 9/1999 | Madnick et al. .......................... | 707/4 |
| 6,038,566 | * 3/2000 | Tsai ...................................... | 707/102 |
| 6,044,420 | * 3/2000 | Matsunaga et al. . | |
| 6,061,700 | * 9/2000 | Brobst et al. ......................... | 707/517 |
| 6,102,969 | * 8/2000 | Christianson et al. .................... | 717/8 |
| 6,167,393 | * 12/2000 | Davis, III et al. ........................ | 707/3 |

FOREIGN PATENT DOCUMENTS

| | | | |
|---|---|---|---|
| WO-94/20915-A3 | * 9/1994 | (WO) ............................ | G06F/15/403 |

OTHER PUBLICATIONS

"Using Semantic Values to Facilitate Interoperability Among Heterogeneous Information Systems", Working Paper, Alfred P. Sloan School of Management, Massachusetts Institute of Technology, Feb., 1993.

"What's the meaning of this?!", *Computer World*, pp. 89–93 (1994).

"InfoSleuth: Networked Exploitation of Information Using Semantic Agents", Woelk, et al., Digest of Papers of the Computer Society Computer Conference (Spring) Compcon, Technologies for the Information Superhighway, San Francisco, California, Mar. 5–9, 1995, pp. 147–152.

"The Context Interchange Network Prototype", Sixth IFP TC–2 Working Conferences on Data Semantics (DS–6), Massachusetts Institute of Technology, The Sloan School of Management, May 1995.

"Database Applications Semantics", Proceedings of the IFIP WG 2.6 Working Conference on Database Applications Semantics (DS–6), Stone Mountain, Altlanta, Georgia, May 30–June 2, 1995, pp. 66–91.

"Ontologies, Contexts, and Mediation: Representing the Reasoning about Semantics Conflicts in Heterologous and Autonomous Systems", Working Paper, MIT Sloan School of Management, Aug., 1995.

"Using Knowledge about Data to Integrate Disparate Sources", Madnick et al. Intelligent Integration of Information ($I^3$) Workshop, Sloan School of Management, MIT, San Diego, California, Jan. 9–12, 1996.

"Data Wrapping on the World Wide Web,", Qu, Jessica F., Masters Thesis, Sloan School of Management, MIT, Feb., 1996.

"Programming the Web–Design and Implementation of a Multidatabase Browser", Jakóbiasiak, Marta, Masters Thesis, Sloan School of Management, MIT, May 1996.

(List continued on next page.)

*Primary Examiner*—Paul R. Lintz
(74) *Attorney, Agent, or Firm*—Testa, Hurwitz & Thibeault, LLP

(57) ABSTRACT

A system for querying disparate, heterogeneous data sources over a network, where at least some of the data sources are World Wide Web pages or other semi-structured data sources, includes a query converter, a command transmitter, and a data retriever. The query converter produces, from at least a portion of a query, a set of commands which can be used to interact with a semi-structured data source. The query converter may accept a request in the same form as normally used to access a relational data base, therefore increasing the number of data bases available to a user in a transparent manner. The command transmitter issues the produced commands to the semi-structured data source. The data retriever then retrieves the desired data from the data source. In this manner, structured queries may be used to access both traditional, relational data bases as well as non-traditional semi-structured data bases such as web sites and flat files. The system may also include a request translator and a data translator for providing data context interchange. The request translator translates a request for data having a first data context into a query having a second data context which the query converter described above. The data translator translates data retrieved from the data context of the data source into the data context associated with the request. A related method for querying disparate data sources over a network is also described.

36 Claims, 9 Drawing Sheets

OTHER PUBLICATIONS

"Scaling Heterogenous Databases and the Design of Disco", Tomasic et al., Proceedings of the 16th International Conference on Distributed Computing Systems, Hong Kong, May 27–30, 1996, pp. 449–457.

"The Distributed Information Search Component (Disco) and the World Web", ACM Sigmod International Conference on Management of Data, Tucson, Arizona, U.S.A. May 13–15, 1997, pp. 546–548.

Qu, Jessica F., "Data Wrapping on the World Wide Web," Masters Thesis, Sloan School of Management, Massachusetts Institute of Technology, Feb. 1996.*

Jakóbiasniak, Marta, "Programming the Web—Design and Implementation of a Multidatabase Browser," Masters Thesis, Sloan School of Management, Massachusetts Institute of Technology, May 1996.*

Siegel, et al. "Using Semantic Values to Facilitate Interoperability Among Heterogeneous Information Systems", Working Paper, Alfred P. Sloan School of Management, Massachusetts Institute of Technology, Feb. 1993.*

Kay, Roger L., "What's the meaning of this?!", *Computerworld*, pp. 89–93 (1994).*

Daruwula, et al. "The Context Interchange Network Prototype", Sixth IFP TC-2 Working Conferences on Data Semantics (DS-6), Massachusetts Institute of Technology, The Sloan School of Management, May 1995.*

Goh, C.H. et al. "Ontologies, Contexts, and Mediation: Representing and Reasoning about Semantics Conflicts in Heterogeneous and Autonomous Systems", Working Paper, MIT Sloan School of Management, Aug. 1995.

Madnick, S. et al. "Using Knowledge About Data to Integrate Disparate Sources", Intelligent Integration of Information($I^3$) Workshop, Sloan School of Management, Massachusetts Institute of Technology, San Diego, California, Jan. 9–12, 1996.

Daruwala et al,. "The Context Interchange Network", Database Applications Semantics, Proceedings of the IFIP WG 2.6 Working Conference on Database Applications Semantics (DS-6), Stone Mountain, Atlanta, Georgia, U.S.A., May 30–Jun. 2, 1995, pp. 65–91.

Tomasic et al., "Scaling Heterogeneous Databases and the Design of Disco", Proceedings of the 16th International Conference on Distributed Computing Systems, Hong Kong, May 27–30, 1996, pp. 449–457.

Tomasic et al., "The Distributed Information Search Component (Disco) and the World Wide Web", ACM Sigmod International Conference on Management of Data, Tucson, Arizona, U.S.A. May 13–15, 1997, pp. 546–548.

Woelk et al., "InfoSleuth: Networked Exploitation of Information Using Semantic Agents", Digest of Papers of the Computer Society Computer Conference (Spring) Compcon, Technologies for the Information Superhighway, San Francisco, California, Mar. 5–9, 1995, pp. 147–152.

* cited by examiner

QUERY AND RETRIEVING SEMI-STRUCTURED DATA FROM HETEROGENEOUS SOURCES BY TRANSLATING STRUCTURED QUERIES

RELATED APPLICATIONS

This application is a continuation of U.S. patent application Ser. No. 08/698,166, filed Aug. 8, 1996 which is now U.S. Pat. No. 5,913,214 and is a continuation-in-part of U.S. Ser. No. 08/657,750, filed May 30, 1996, which is now U.S. Pat. No. 5,953,716.

GOVERNMENT SUPPORT

This invention was made with government support under Contract No. F30602-93-C-0160 awarded by the United States Air Force. The government has certain rights in the invention.

TECHNICAL FIELD

The present invention relates to retrieving data from heterogeneous data sources including structured sources and semi-structured sources and, more particularly, extracting data from World Wide Web pages in response to a query phrased in a structured query language.

BACKGROUND INFORMATION

The World Wide Web (WWW) is a collection of Hypertext Mark-Up Language (HTML) documents resident on computers that are distributed over the Internet. The WWW has become a vast repository for knowledge. Web pages exist which provide information spanning the realm of human knowledge from information on foreign countries to information about the community in which one lives. The number of Web pages providing information over the Internet has increased exponentially since the World Wide Web's inception in 1990. Multiple Web pages are sometimes linked together to form a Web site, which is a collection of Web pages devoted to a particular topic or theme.

Accordingly, the collection of existing and future World Wide Web pages represents one of the largest databases in the world. However, access to the data residing on individual Web pages is hindered by the fact that World Wide Web pages are not a structured source of data. That is, there is no defined "structure" for organizing information provided by the Web page, as there is in traditional, relational databases. For example, different Web pages may provide the same geographic information about a particular country, but the information may appear in various locations of each page and may be organized differently from page to page. One particular example of this is that one Web site may provide relevant information on one Web page, i.e. in one HTML document, while another Web site may provide the same information distributed over multiple, interrelated Web pages.

A further difficulty associated with retrieving data from the Word Wide Web is that the Web is "document centric" rather than "data centric". This means that a user is assumed to be looking for a document, rather than an answer. For example, a user seeking the temperature of the Greek Isles during the month of March would be directed to documents dealing with the Greek Isles. Many of those documents might simply contain the words "March," "Greek," and "temperature" but otherwise be utterly devoid of temperature information, for example, "the temperature during the day is pleasant in March, especially if one is visiting the Greek Isles." These documents are useless to the requesting user, however, current techniques of accessing the Web cannot distinguish useless "near-hits" from useful documents. Further, the user is seeking an "answer" (e.g. 65° F.) to a particular question, and not a list of documents that may or may not contain the answer the user is seeking.

Another difficulty associated with extracting data from Web pages is that each Web page potentially provides data in a different format from other Web pages dealing with the same topic or in a different context from the request itself. For example, one Web page may provide a particular value in degrees Centigrade, while another World Wide Web page, or the user seeking the information, may expect that same information to be in degrees Fahrenheit. A requesting system or user would be misled or confused by an answer returned in degrees Centigrade because the requester and the data source do not share the same assumptions about the provision of data values.

These problems are not limited to retrieving data from HTML documents distributed over the Internet. Larger organizations have begun building "intranets", which are collections of linked HTML documents internal to the organization. While "intranets" are intended to provide a member of an organization with easy access to information about the organization, the problems discussed above with respect the WWW apply to "intranets". Requiring members of the organization to learn the data context of each Web page, or requiring them to learn a specialized query language for accessing Web pages, would defeat the purpose of the "intranet" and would be virtually impossible on the Internet.

SUMMARY OF THE INVENTION

The present invention allows semi-structured data sources to be queried using a structured query language. This allows semi-structured data sources, such as World Wide Web pages (HTML documents), flat files containing data (data files containing collections of data that are not arranged as a relational database), or menu-driven database systems (sometimes referred to as "legacy" systems) to augment traditional, structured databases without requiring the requester to learn a new, separate query language. Structured queries directed to semi-structured sources are identified, converted into commands the semi-structured data sources understand, and the commands are issued to the data source. Data is extracted from the semi-structured data source and returned to the requester. Thus, semi-structured data sources can be accessed using a structured query language in a way that is transparent to the requester.

A system according to the invention queries both structured and semi-structured data sources. The system includes a request translator, a query converter, a command transmitter, a data retriever, and a data translator. The request translator receives a data request which has an associated data context and translates that data request into a query which has an associated data context which is appropriate for the data source to be queried. The query converter converts at least a portion of the query into a command or series of commands that can be used to interact with a semi-structured data source such as a Web page or a flat file containing data. The command transmitter issues those commands to the semi-structured data sources, and a data retriever extracts data from the data sources. Extracted data is translated by the data translator from the data context of the data source into the data context associated with the initial request.

A method according to the invention queries both structured and semi-structured data sources. The method includes translating a data request into a query, converting at least a portion of the query into a stream of commands, issuing the commands to the semi-structured data sources, extracting data from the data sources, and translating the retrieved data. The data request, which has an associated data context, is translated into the query which has a data context that matches the data source to be queried. At least a portion of that query is converted into one or more commands which can be used to interact with a semi-structured data source. Those commands are issued and data is extracted from the data source. Extracted data is then translated from the data context associated with the data source into the data context associated with the initial request.

In other aspects of the invention, a method and system for querying semi-structured data sources in response to a structured data request comprise the steps of, and means for, converting the data request into one or more commands, issuing the commands to a semi-structured data source, and extracting data from the semi-structured data source. The semi-structured data source can be a World Wide Web page, a flat file containing data, or a menu-driven database system. In some embodiments, the conversion of the data request into one or more commands also includes determining if the requested data is provided by a Web page and then determining, for each requested datum provided by the Web page, one or more commands to issue to the Web page in order to retrieve the data. These determinations are made by accessing a file which is stored in a memory element of a computer and which includes information on the data elements provided by the data source as well as the commands necessary to access the data.

BRIEF DESCRIPTION OF THE DRAWINGS

The invention is pointed out with particularity in the appended claims. The above and further advantages of this invention may be better understood by reference to the following description taken in conjunction with the accompanying drawings, in which:

DESCRIPTION

Figure 1A:
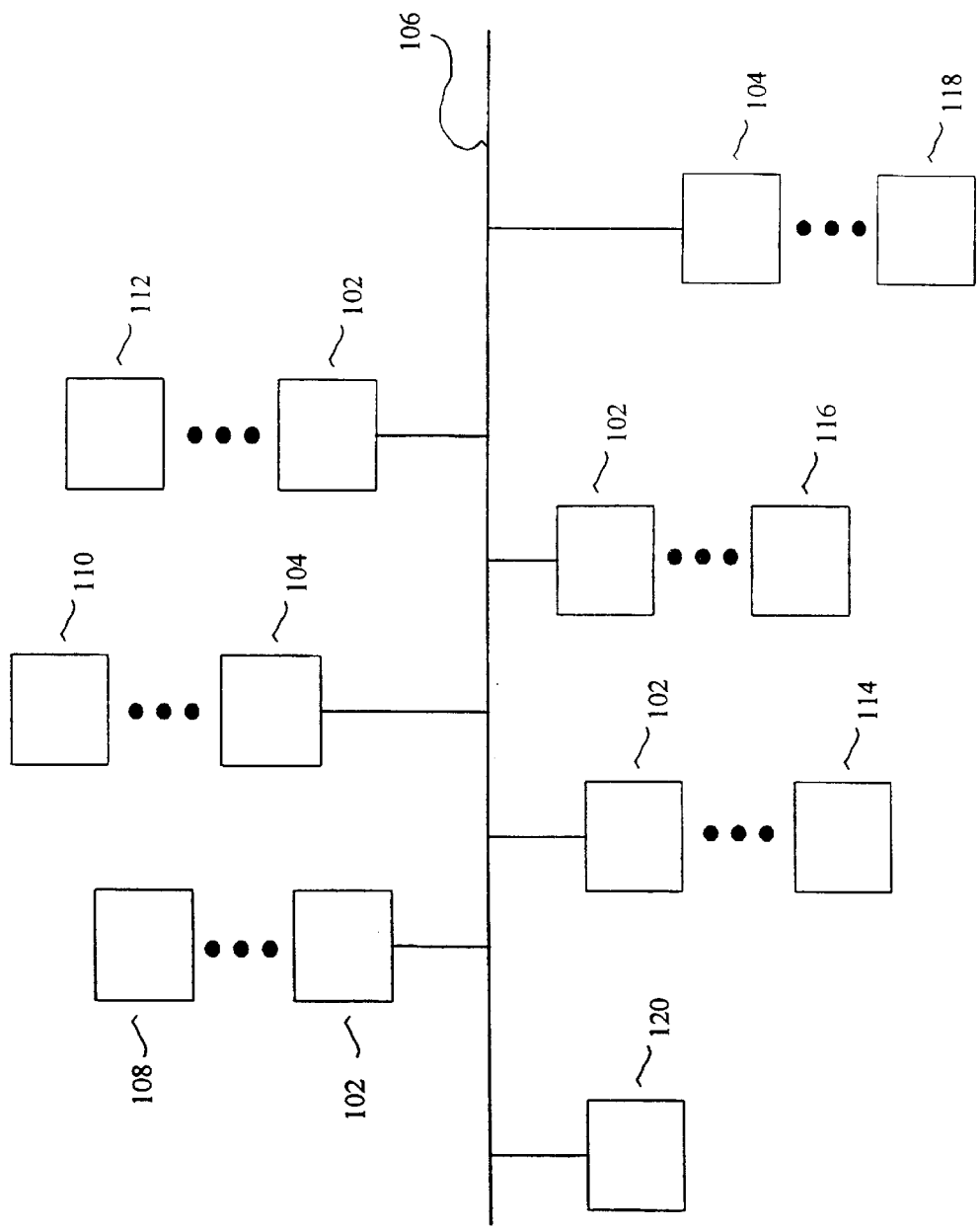
FIG. 1A is a diagram of an embodiment of a system according to the invention which includes data receivers and data sources interconnected by a network.
Figure 1B:
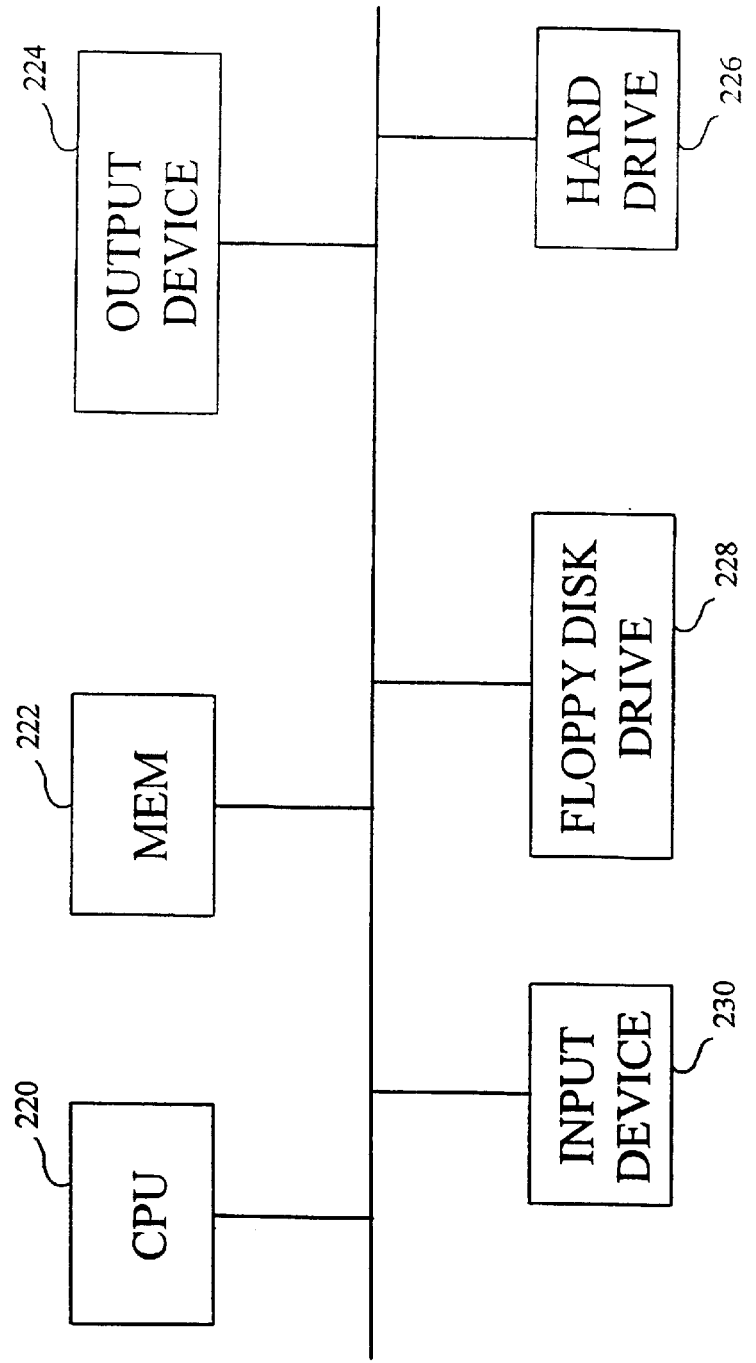
FIG. 1B is a simplified functional block diagram of a node as shown in FIG. 1A.

Referring to FIGS. 1A and 1B, data receivers 102 and data sources 104 are interconnected via a network 106. Although data receivers 102 are shown separate from data sources 104, any node connected to the network 106 may include the functionality of both a data receiver 102 and a data source 104.

Each of the nodes 102, 104 may be, for example, a personal computer, a workstation, a minicomputer, a mainframe, a supercomputer, or a Web Server. Each of the nodes 102, 104 typically has at least a central processing unit 220, a main memory unit 222 for storing programs or data, and a fixed or hard disk drive unit 226 which are all coupled by a data bus 232. In some embodiments, nodes 102, 104 include one or more output devices 224, such as a display or a printer, one or more input devices 230, such as a keyboard, mouse or trackball, and a floppy disk drive 228. In a preferred embodiment, software programs running on one or more of the system nodes define the functionality of the system according to the invention and enable the system to perform as described. The software can reside on or in a hard disk 226 or the memory 222 of one or more of the system nodes.

The data sources 104 can be structured databases, semi-structured Web pages, or other types of structured or semi-structured sources of data such as files containing delimited data, tagged data or menu-driver database systems. The network 106 to which the nodes 102, 104 are connected may be, for example, a local area network within a building, a wide-area network distributed throughout a geographic region, a corporate Intranet, or the Internet. In general, any protocol may be used by the nodes 102, 104 to communicate over the network 106, such as Ethernet or HTTP (Hypertext Transfer Protocol).

A set of assumptions regarding data is associated with each node 102, 104. That is, each node 102, 104 has an associated data context 108–118. For example, a particular data receiver 102 may always expect that when data is received, time values are in military time, monetary values are in thousands of U.S. dollars, and date values are returned in month-day-year format. This set of assumptions is the data context 108 of that particular data receiver 102. Another data receiver 102 may make a different set of assumptions about received data which are represented as its own data context 112. When a data receiver 102 makes a request for data, its data context 108, 112, 114, 116 is associated with the request. Similarly, each data source 104 provides the data context 110, 118 associated with its data.

The data context 108–118 of a node 102, 104 may be a file containing a list of data formats and associated meanings expected by that node 102, 104. For example, if a particular node 102, 104 expects to receive or provide data which it calls "net income" in units of dollars with a scale of thousands, that set of expectations may be specified in a file which represents at least a portion of the data context 108–118 associated with that node 102, 104. The data context 108, 112, 114, 116 of a data receiver 102 may be provided with each new request made by the data receiver 102. In one embodiment discussed in greater detail below, the data context 108–118 for each node 102, 104 may be stored in a central location through which all requests are routed for context mediation, or the data contexts 108–118 may be stored in a de-centralized manner. For example, the data contexts 108–118 may be stored as a directory of URL (Uniform Resource Locator) addresses which identify the location of each data context 108–118.

Figure 2:
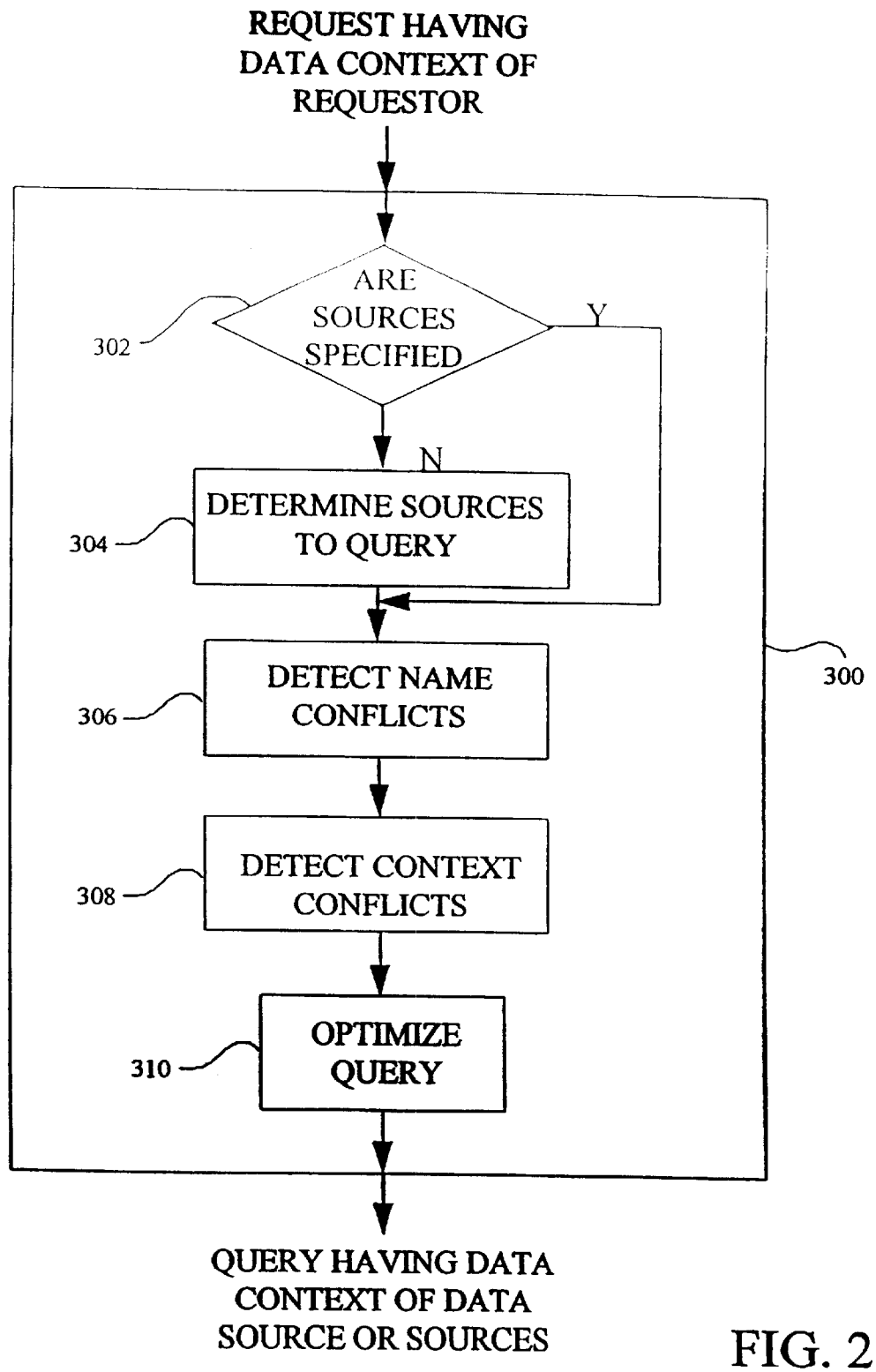
FIG. 2 is a flowchart of the steps taken by an embodiment of the request translator.

A request for data made by a data receiver 102 is associated with the data context 108, 112, 114, 116 of the data receiver 102. Referring to FIG. 2, one embodiment of a request translator 300 determines if the data context 108, 112, 114, 116 of the data receiver 102 is different from the data context 110, 118 of the data sources 104 that will be queried to satisfy the request. The request translator 300 may be resident on the data receiver 102 making the request, or it may reside on another node 102, 104 attached to the network. In some embodiments, the request translator 300 resides on a special purpose machine 120 which is connected to the network 106 for the sole purpose of comparing data contexts 108–118 and resolving conflicts between the data contexts 108–118 of data receivers 102 and data sources 104.

The request translator 300 may be implemented as hardware or software and, for embodiments in which the request translator is implemented in software, it may be the software program that generates the request. Alternatively, the request translator 300 may be a separate functional unit from the hardware or software used to generate the request, in which case the request translator receives the request as constructed by that hardware or software. For example, the request translator may be part of an SQL-query language application, or the request translator may receive requests made by an SQL-query language application, for example, a spreadsheet having embedded queries resulting in ODBC-compliant (Open Database Connectivity-compliant) commands.

The request translator may be provided with the identity of the data sources 104 to be queried (step 302). That is, the request may specify one or more data sources 104 to which the query should be directed. In these embodiments, the request translator compares the data context 110, 118 of the data source 104 to the data context 108, 112, 114, 116 of the data receiver 102. If any conflicts are detected, e.g. the data source 104 expects to provide monetary values in hundreds of Japanese Yen and the data receiver 102 expects to receive monetary values in thousands of U.S. Dollars, the request translator translates the request to reflect the data context 108 of the data source 104. In other embodiments, the request translator is not provided with the identity of the data sources 104 to be queried, and the request translator may determine which data sources 104 to query (step 304). These embodiments are discussed in more detail below.

When the request translator is translating the data request made by the data receiver 102, it must detect conflicts between the names by which data are requested and provided (step 306), and it must detect the context of that data (step 308). For example, a data receiver 102 may make a request for a data value that it calls "net worth". A data source 104 may be identified as having the data to satisfy the request made by the data receiver 102, however, the data source 104 may call that same number "total assets". The request translator must recognize that, although different names are used, the data source 104 and the data receiver 102 are referring to the same data entity.

Name and context conflicts may be determined through the use of an ontology, or set of ontologies, in connection with the data context 108–118 mappings. An ontology is an overall set of concepts for which each data source 104 and data receiver 102 registers its values. Ontologies may be distributed over the network 106 on multiple notes 102, 104. Alternatively, all ontologies may reside on a single node 102, 104 connected to the network 106 for the purpose of providing a library of ontologies.

Figure 4:
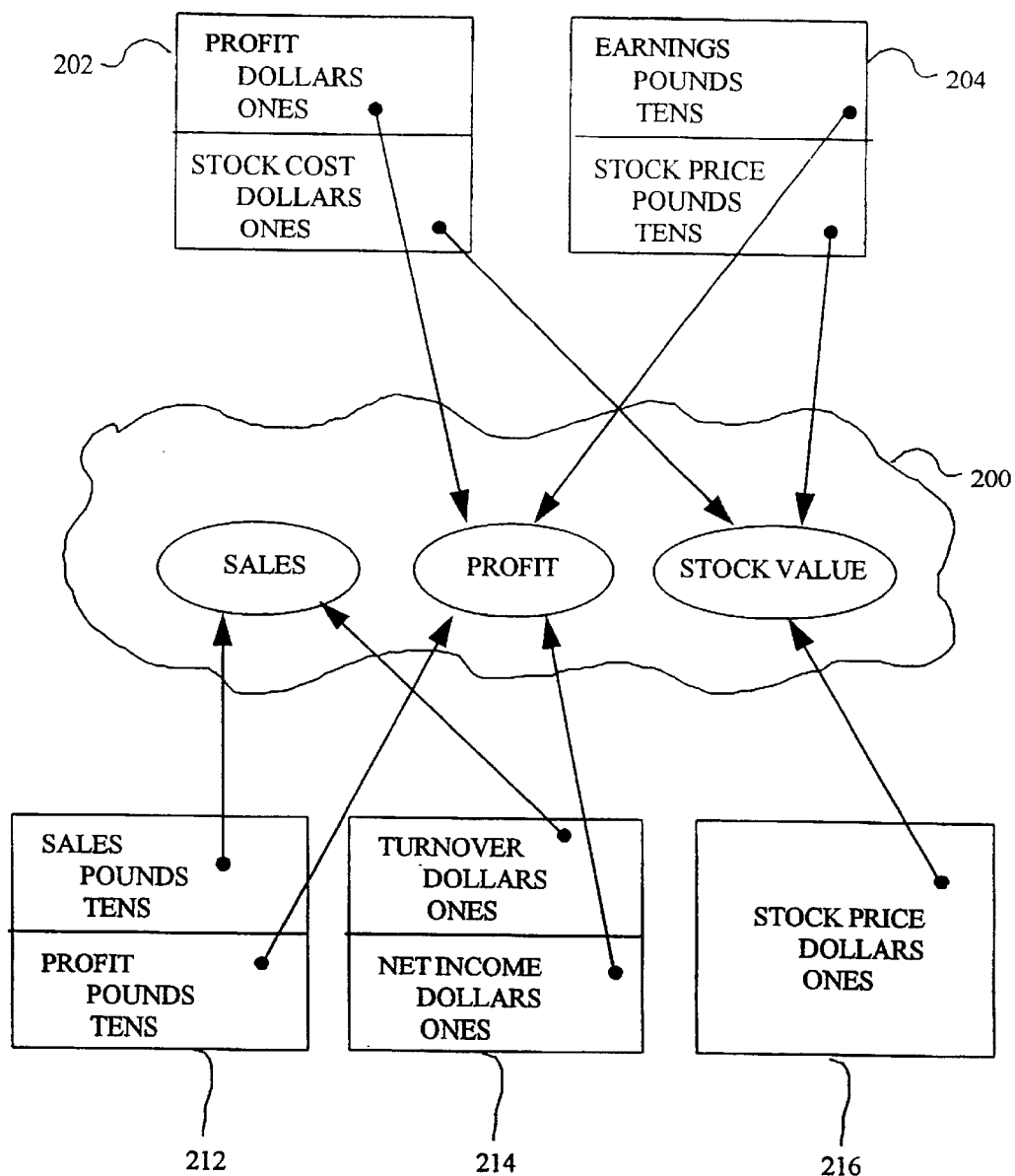
FIG. 4 is a diagram of an embodiment of an ontology as used by the system of FIG. 1A.

Referring to FIG. 4, an example of a financial ontology 200 is shown. Nodes 102, 104 register context values for sales, profit, and stock value. A data source 104 may be registered by its system administrator or by a context registration service, or a user may register a particular data source 104 from which it desires to receive data. As shown in FIG. 4, a first user 202 and a second user 204 have registered with the financial ontology 200. The first user 202 registers that it uses the name "profit" for profit and "stock cost" for stock value. The second user 204 has registered that its name for the concept of profit in the financial ontology 200 is "earnings" and it calls stock value by the name "stock price". Each user 202, 204 is a possible data receiver 102, and is attached to the network 106. In much the same way, data sources 104 register, or are registered. For example, a first data source 212 has registered that it can provide data which it calls "sales" and "profit", which map to ontology 200 values of sales and profit. A second data source 214, in contrast, provides a "turnover" datum which maps to sales in the financial ontology 200 and a "net income" datum which matches to profit in the financial ontology 200.

Figure 5:
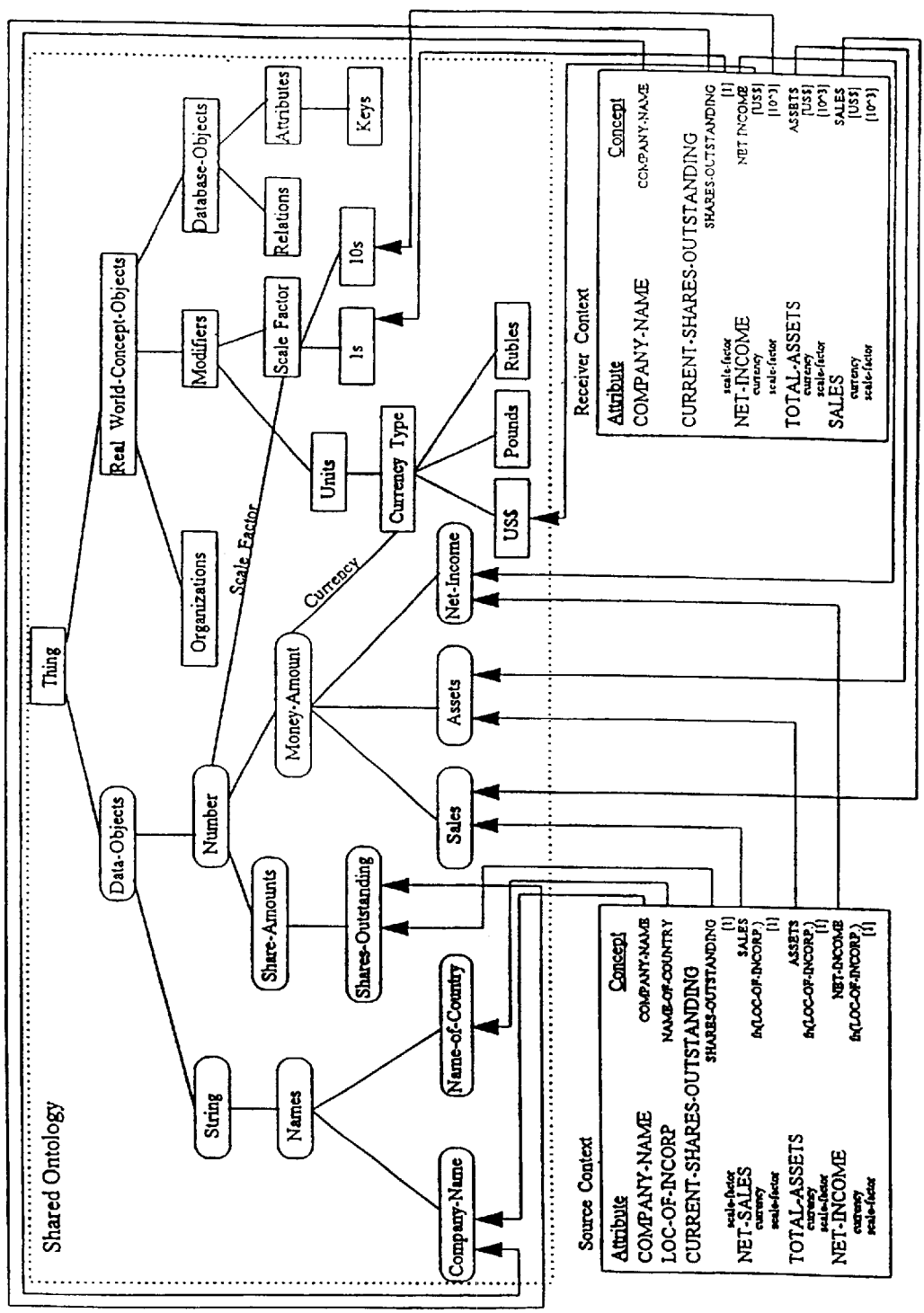
FIG. 5 is a diagram of an embodiment of an ontology showing examples of data contexts.

The data contexts 108–118 registered within each ontology may exist as a file which has entries 502, 504 for each node 102, 104 corresponding to shared concepts in the ontology 200, shown in FIG. 5. The data contexts 108–118 may be provided as data records in a file or as a list of pointers which point to the location of each node's data context 108–118. Attributes may directly link to concepts in an ontology. For example, an entry may specify that if sales figures are desired from the first data source 212, request data using the name "sales." Alternatively, entries in a data context might rely on other attributes for their value. For example, an attribute may derive its currency context based on the value of the user's location. For example, source context 502 reports data for the NET-SALES attribute in the currency corresponding to the value of the LOC-OF-INCORP attribute. More specifically, NET-SALES for French companies have a currency context of Francs, while German companies expect or provide NET-SALES in units of Marks. Ontologies may be distributed over the network 106 on multiple nodes 102, 104. Alternatively, all ontologies-may reside on a single node 102, 104 connected to the network 106 for the purpose of providing a library of ontologies.

A step that the request translator takes before actually querying the data source 104 is to detect any conflicts in the names used by the data receiver 102 and the data source 104 (step 306). For example, when the request translator 300 initially receives a request from the first user 202 for companies having "profit" and "stock cost" in excess of some value, it must detect any conflicts in the names used by the first user 202 and the data source 104. Assuming that the first user 202 specifies the second data source 214 as the source 104 from which data should be retrieved, the request translator must recognize that when the first user 202 requests "profit", user 202 is seeking profit which is represented by "turnover" in the second data source 214. Similarly, when the first user 202 requests data regarding "stock cost", that data maps to stock value in the financial ontology 200 for which the second data source 214 has not registered. Thus, the request translator 300 would return a message that the second data source 214 cannot satisfy the entire data request made by the first user 202.

Another step that the request translator 300 takes before actually querying the data source 104 is to detect conflicts in the data context 108 associated with the data receiver 102 and the data source 104 (step 308). For example, the second user 204 in FIG. 4 expects to receive "earnings" and "stock price" values in units of tens of pounds, while the first user 202 expects to receive "profit" and "stock cost" data in units of ones of dollars. Thus, when the second user 204 requests "earnings" and specifies that the second data source 214 should be used, the request translator detects the conflict between what the second user 204 calls "earnings" and what the second data source 214 calls "net income", because both of those data names map to "profit" in the financial ontology 200. The request translator 300 also detects the context conflict between the second user 204 and the second data source 214. The second user 204 expects to receive data in tens of pounds, while the second data source 214 expects to give data in terms of ones of dollars. The request translator 300 translates the request made by the second user 204 for "earnings" in units of tens of pounds to a query directed to the second data source 214 for "net income" in units of ones of dollars.

When the request is translated into a query, the meaning ascribed to data by separate nodes 102, 104 can be taken into account. For example, data source 212 may provide "profit" data which excludes extraordinary expenses. However, the first user 202 may desire "profit" data including extraordinary expenses. The ontology 200 may provide a default translation for this difference in meaning, or the first user 202 may provide a translation which overrides the default translation.

Other translations may be inferred from entries in the ontology 200. For example, currency values for a given ontology 200 may be inferred from a location entry. Thus, data receivers 102 located in England may be assumed to desire financial data in pounds. The ontology 200 may provide for translations between these units. These assumptions may be overridden by a particular data receiver 102 or data source 104, as described below.

Another example of inferring translations from entries in the ontology 200 is as follows. A requester may expect "earnings" to be calculated as "revenue" minus "expenses". A data source, however, may provide "earnings" as "revenue" minus "expenses" minus "extraordinary expenses". The ontology can provide the translation from the source to the receiver, which may include adding the "extraordinary expenses" into the "earnings" numbered provided by the data source.

Figure 3:
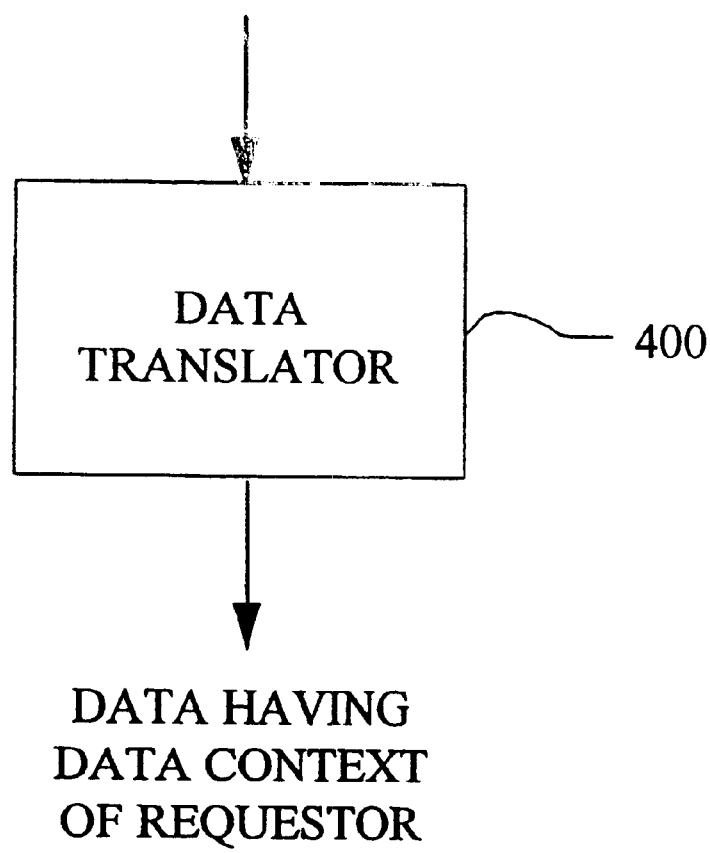
FIG. 3 is a diagram of a data translator according to the invention.

Referring to FIG. 3, a data translator 400 receives data from the data sources 104 that are queried. Since a conflict between the data context 108, 112, 114, 116 of the data receiver 102 and the data context 110, 118 of the data source 104 has already been detected, the data received from the data source 104 is translated to match the data context 108 that the data receiver 102 expects. Once translated, the received data is in a form the data receiver 102 expects, and the request made by the data receiver 102 is satisfied. The data translator 400 may be provided as a separate unit from the request translator 300, or they may be provided as a unitary whole. Alternatively, the request translator 300 and the data translator 400 may be programs running on one or multiple computers.

The translations effectuated by the request translator 300 and the data translator 400 may be accomplished by using pre-defined functions, look-up tables, or database queries among other well-known techniques. For example, when the "net income" datum must be translated by the request translator 300, it may request the exchange rate from dollars to pounds from an appropriate currency database and then use that exchange rate to translate the received datum. In some embodiments, the ontology 200 provides a set of default translations for the request translator 300 and data translator 400 to use. These default translations may, however, be overridden by a data receiver 102 or data source 104 that prefers a different translation to be used. For example, an ontology 200 may provide a default translation between tens of pounds and ones of dollars that uses a pre-defined function to multiply data in pounds by 6.67. Alternatively, the conversion could be done as a number of steps. For example, the ontology may provide a conversion from dollars to pounds and a conversion from tens to ones which are applied in succession to the data. A particular data receiver 102 may not desire such a rough estimate, however, and may therefore provide its own translation in its data context 108–118 which overrides the default translation provided by the ontology 200.

Multiple conversions may be used if the query accesses multiple data sources. For example, a data receiver 102 may makes a request having two parts. One part may be satisfied by a first data source 104 and that data is required to be converted by a look-up function. The second part of the request may be satisfied by a second data source which requires data to be converted by a database query.

The request translator 300 may query the data source 104 for the data receiver 102. In these embodiments, the request translator may optimize the query (step 310) using any well-known query optimization methods, such as Selinger query optimization. Alternatively, the request translator 300 may separate a query into several separate sub-queries and direct those sub-queries to one data source 104 or multiple data sources 104. In another embodiment, the request translator 300 simply passes the query to a query transmitter which may also optimize the query or separate the query into several sub-queries, as described above.

In some embodiments, the data receiver 102 does not specify which data source 104 to use in order to retrieve the data. For example, in FIG. 4 the second user 204 may simply request a list of all the companies having "earnings" in excess of some number of pounds, and a "stock price" below a certain number of pounds. The request translator 300 determines if such a request may be satisfied (step 304). Since the second user 204 has registered that "earnings" are equivalent to profit in the financial ontology 200 and that "stock price" is equivalent to "stock value" in the financial ontology 200, the request translator 300 may then determine if any data sources 104 have also registered with the financial ontology 200 as providing those values.

The request translator 300 is able to determine that the first data source 212 and the second data source 214 have both registered with the financial ontology as providing a "profit" datum while the third data source 216 has registered with the financial ontology as providing a "stock value" datum. The request translator may separate the request into two sib-queries, one for "stock price", which is directed to the third data source 216, and one for "earnings".

At this point, the request translator 300 may further optimize the query by selecting to which data source the request for "earnings" should be directed (step 310). The first data source 212 has registered with the financial ontology as providing a "profit" datum, called "profit" by the first data source 212, in tens of pounds, while the second data source 214 has registered with the financial ontology as providing a "profit" datum, called "net income" by the second data source 214, in ones of dollars. Since the second user 204 requested earnings in tens of pounds, if the query is directed to the second data source 214, no context conversion is necessary. Therefore, the request translator 300 may choose to request the "profit" datum from the second data source 214 in order to further optimize the query.

However, the request translator 300 may determine that the second data source 214 is unavailable for some reason. In such a case the request translator may direct the request for "profit" data to the first data source 212 by translating the request made by the second user 204 from tens of pounds into a query directed to the second data source 214 in ones of dollars. As described above, this translation may be done by a predefined function, a look-up table, or a database query.

Once the data sources 104 are chosen and any context translation that is necessary is done, queries are submitted to the selected data sources 104. For example, a query could be submitted to the second data source 214, which requests all companies having a "profit" higher than a certain number of pounds, while a query is submitted to the third data source 216 requesting a list of all the companies having a "stock value" lower than a certain number of dollars. This is done by converting the request for "stock value" in tens of pounds to a query specifying "stock value" in ones of dollars. This allows the third data source 216 to efficiently process the request and return data. The returned data, of course, is in units of ones of dollars, and must be translated into units of tens of pounds before being presented to the data receiver 102 that makes the request.

Once the results of both queries are returned, those results must be "joined", which is a well-known merge routine in the database field. Joining the query results may be done by the request translator or it may be done by the data receiver 102 itself.

Figure 6:
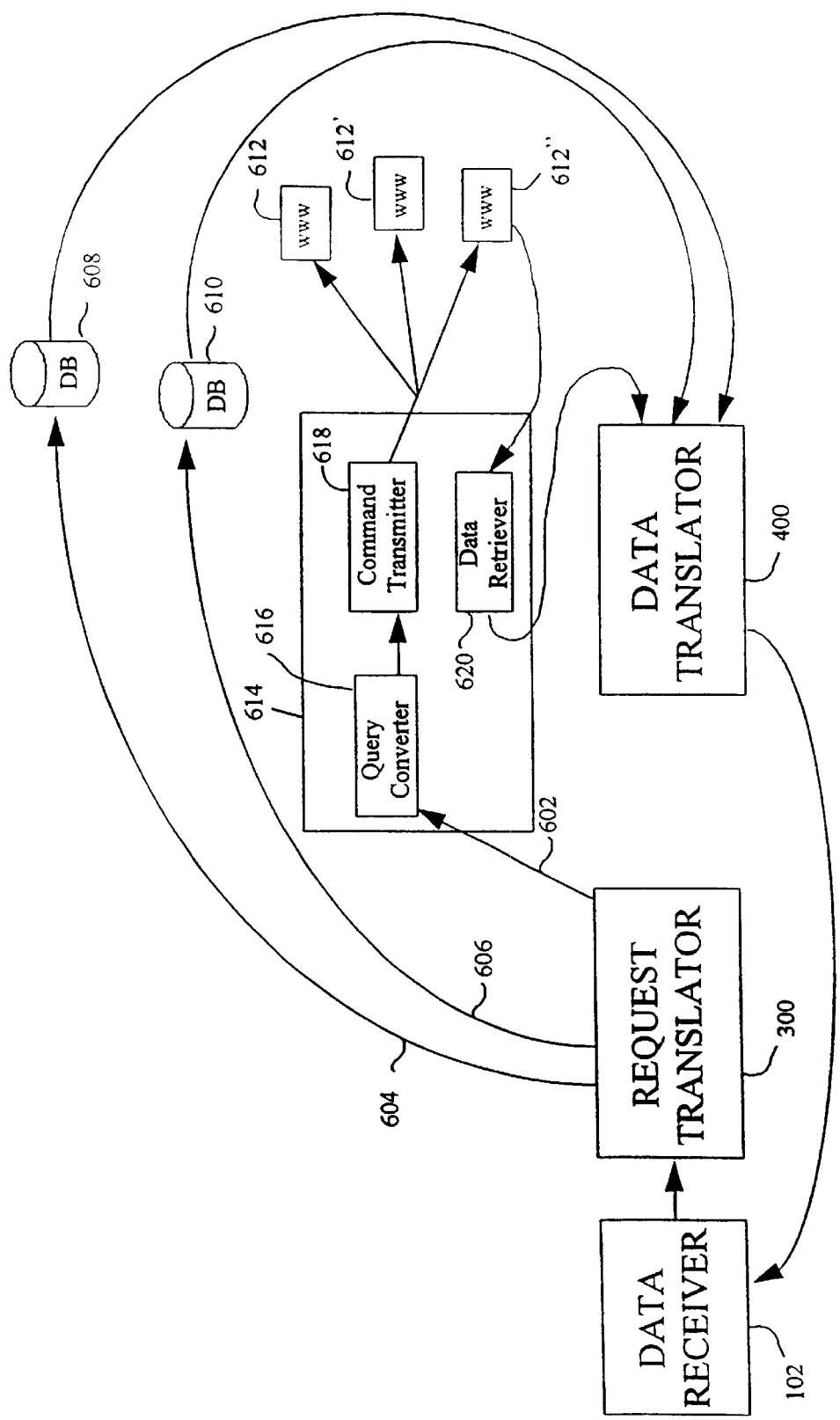
FIG. 6 is a block diagram of an embodiment of a system according to the invention which queries both structured and semi-structured data sources.

In some embodiments, one or more of the target data sources 104 is a semi-structured data source, that is, the data source 104 is of a type that cannot or does not respond to traditional, structured queries as do relational databases. For example, referring to FIG. 6, the data receiver 102 issues a request that, as described above, is translated by the request translator 300 into three sub-queries 602, 604, and 606. The data receiver 102 may specify the target data sources 104 for the request or the request translator 300 may determine which sources 104 to query as described above. Sub-queries 604 and 606 may be issued directly to relational databases 608 and 610 by the request translator 300 without further processing because they comply with the relational database model and respond to structured queries. Sub-query 602, however, cannot be issued directly to World Wide Web pages 612, 612' and 612" because Web pages do not respond to structured queries. Therefore, some additional processing of the sub-query 602 is necessary before data can be retrieved from the World Wide Web pages 612, 612' and 612".

In these cases, additional processing is provided by the wrapper generator 614. In brief overview, the wrapper generator 614 is composed of three sub-units: a query converter 616; a command transmitter 618; and a data retriever 620. These sub-units may be provided as one unitary, special-purpose machine, or they may be separate, special-purpose machines distributed over a network. Alternatively, the wrapper generator 614 may be implemented as one or more programs running on a single general purpose computer. In another alternative, the wrapper generator 614 may be implemented as one or more programs running on multiple, networked machines.

The query converter 616 receives the SQL sub-query 602 and translates it into one or more commands which can be used to interact with the data sources 612, 612', and 612". For cases in which the target semi-structured data source is a Web page or Web site, the command transmitter 618 opens a HTTP (Hypertext Transfer Protocol) connection to the Web pages and sends the converted query, i.e. the commands generated by the query converter 616, to the node 104 on which the requested Web pages 612, 612' and 612" reside. The node 104 returns the Web pages 612, 612' and 612" to the wrapper generator 614 in response to the transmitted commands. The data retriever 620 receives the Web pages 612, 612' and 612" and extracts the requested data from those pages, arranges it in a table, and returns the data to the data translator 400 which, in turn, returns the data to the data receiver 102.

In some embodiments, the request translator 300 has already translated the data context 118 of the data request into the data context 118 of the data sources 104 to be queried.

Figure 7:
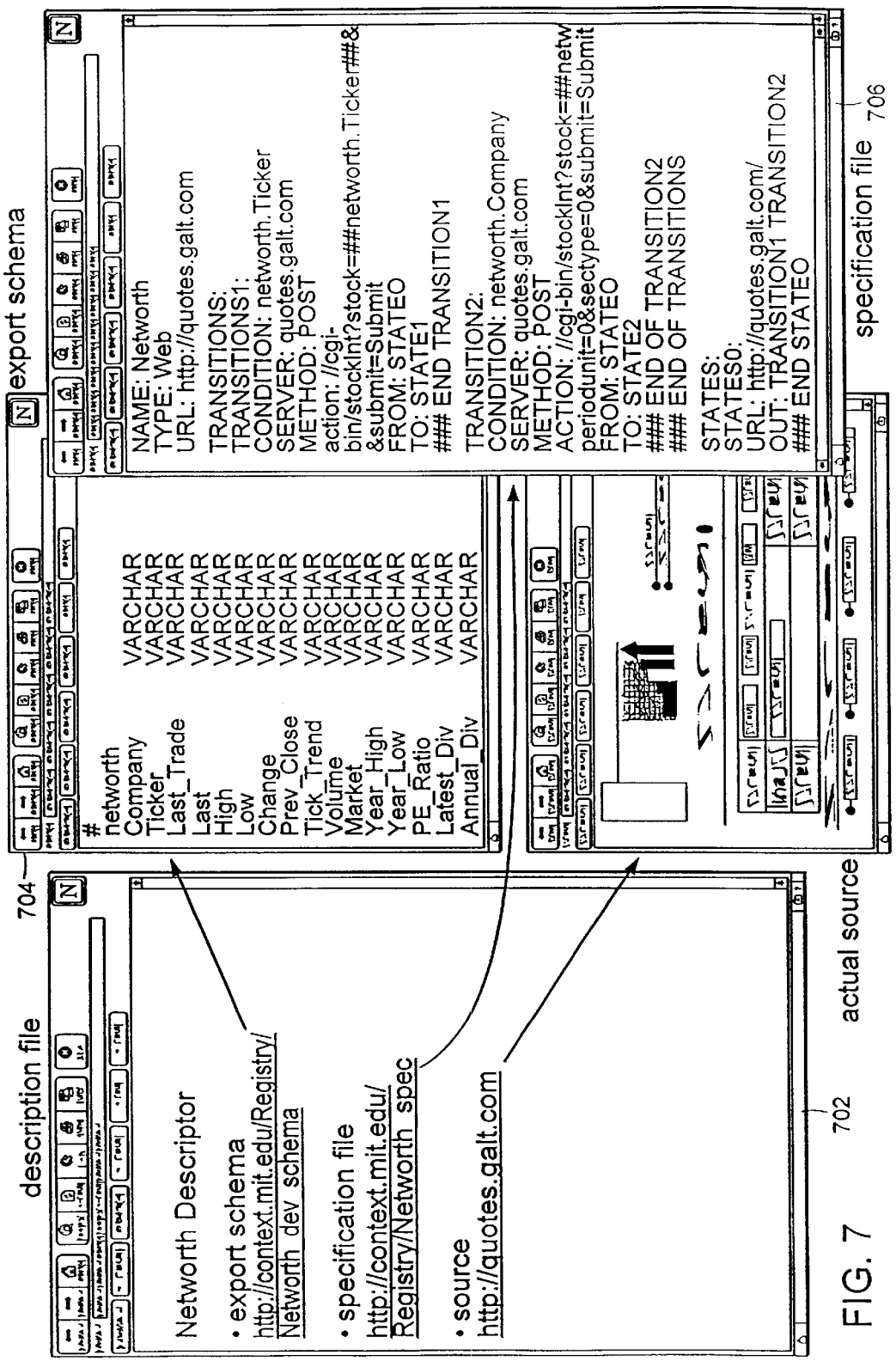
FIG. 7 is a set of screen displays showing a data source, its description file, its export schema, and its specification file.

In more detail, the wrapper generator 614 must convert a received SQL query into a query, or a series of commands, that the semi-structured data source 104 will understand. As noted above in connection with FIG. 5, each data source 104 must register its data context 110, 118 with an ontology 200. Each data source 104 so registered has a descriptor file; in some embodiments the descriptor file is a HTML document. Each descriptor file contains information about the registered data source 104, including an export schema which defines what data elements are available from the source, a specification file which describes the actions needed to be performed in order to retrieve data values from the site, and an address for the actual source of the data, such as an URL. In some embodiments, the descriptor file may contain an indication of the capabilities of the source. An example of a description file 702 is shown in FIG. 7. The descriptor file 702 can contain actual data or, as shown in FIG. 7, the descriptor file 702 may be a directory of URL addresses which locate necessary information about the data source 104.

An export schema 704 defines what data elements are available from each data source 104 and it can be organized in the form of attributes and relations. For example, the export schema 704 shown in FIG. 7 shows a data source having one "table" called networth from which data elements called "Ticker", "Company", "Last", "Last_Trade", "Low", and "High" data elements, among others, may be retrieved from the data source 104. As shown in FIG. 7, the export schema of 704 also contains the data types associated with each attribute or data element. For example, in FIG. 7, the export schema 704 for networth shows that "Company" is a character string of variable length, while "PE-Ratio" is a number. Table 1 below shows the export schema 704 depicted in FIG. 7. In other embodiments, the export schema 704 may contain further information about the data provided by the source 104, such as the context 108 of each data element.

TABLE 1

Sample export schema

| # networth | |
|---|---|
| Company | VARCHAR |
| Ticker | VARCHAR |
| Last_Trade | VARCHAR |
| Last | VARCHAR |
| High | VARCHAR |
| Low | VARCHAR |
| Change | VARCHAR |
| Prev_Close | VARCHAR |
| Tick_Trend | VARCHAR |
| Volume | VARCHAR |
| Market | VARCHAR |
| Year_High | NUMBER |
| Year_Low | NUMBER |
| PE_Ratio | NUMBER |
| Latest_Div | VARCHAR |
| Annual_Div | VARCHAR |

Specification file 706 for a data source 104 describes the commands that must be transmitted to the data source 104 by the command transmitter 618 in order to interact with the data source 104. If the source is a relational database, the command transmitter 618 may simply pass the structured query to the data source 104. For cases in which the data source 104 is a semi-structured data source such as a World Wide Web page, the specification file includes a sequence of commands that must be issued by the command transmitter 618 in order to interact with the Web pages. An embodiment of a specification file 706, as depicted in FIG. 7, is illustrated below in Table 2.

TABLE 2

Sample specification file

NAME: Networth
TYPE: WEB
URL: http://quotes.galt.com
TRANSITIONS:
TRANSITIONS1:
CONDITION: networth.Ticker
SERVER: quotes.galt.com
METHOD: POST
action: //cgi-
bin/stockInt?stock=##networth.Ticker##&action=0&period=15&periodunit=0§ype=0
&submit=Submit
FROM: STATE0
TO: STATE1
END TRANSITION1
TRANSITION2:
CONDITION: networth.Company
SBRVER: quotes.galt.com
METHOD: POST
ACTION: //cgi-bin/stockInt?stock=##networth.Comany##&action=2&period=15&
periodunit=0§ype=0&submit=Submit
FROM: STATE0
TO: STATE2
END TRANSITION2
END TRANSITIONS
STATES:
STATE0:
URL: http://quotes.galt.com/
OUT: TRANSITION1 TRANSITION2
END STATE0
STATE1:
URL: http://quotes.galt.com/cgi-bin/stockclnt
OUT: none
REGULAR EXPRESSIONS:

| | |
|---|---|
| networth.Company | [|]LdFONT§SIZE=÷[|]Lf(.*?[,]s+»›+»# |
| networth.Ticker | §Ü(.*?)[|]Ld/FONT[|]Lf# |
| networth.Last | Last[|]Ld/A[|]Lf§+(.*?)§+[|]LdA# |
| networth.Last_Trade | Ülast§trade:§(.*?)§EST»# |
| networth.Low | Day§Range[|]Ld/A[|]Lf§[|]LdID[|]Lf§*(.*&)§*§*÷# |
| nethworth.High | Day§RANGE[|]Ld/A[|]Lf§[|]LdTD[|]Lf.*?§*(.*?ß§+# |
| networth.Change | Change[|]Ld/A[|]Lf§+(.*?) # |
| networth.Prev_Close | Prev.§Close[|]Ld/A[|]Lf§(.*?) # |
| networth.Tick-Trend | Tick§Trend[|]Ld/A[|]Lf§+»+TD[|]Lf(.*?[|]Ld/TD[|]Lf# |
| networth. Volume | Volume[|]LdA[|]Lf§+(.*?)§+<A# |
| networth.Market | Market[|]LdA[|]Lf§+(.*?)§+n# |
| networth. Open | Open:[|]Ld/A[|]Lf§+(.*?)§+<A# |
| networth.Year_Low | 52§weeks®ange[|]Ld/A[|]Lf§+(.*?)§-# |
| networth.Year_High | 52§week§Range[|]Ld/A[|]Lf§+.*-§(.*?) # |
| networth.PB_Ratio | P/E§Ratio[|]Ld/A[|]Lf§+(.*?§+[|]LdA# |
| networth.Latest_Div | Latest§Div.[|]Ld/A[|]Lf§+(.*?)§*[|]LdA# |
| networth.Annual_Div | Annual§Div.[|]Ld/A[|]Lf§+(.*?)§*[|]Ld/PRE[|]Lf# |

END STATE1
STATE2
URL: http://quotes.galt.com/cgi-bin/stackclnt
OUT: NONE
REGULAR EXPRESSIONS:

| | |
|---|---|
| networth.Company | &stock=.*'[|]Lf.*§-§(.*?)[|]Ld/A[|]Lf# |
| networth.Ticker | &stock=.*"[|]Lf(.*?)§-# |

END STATE2
END STATES

Table 2 above uses various PERL operators in order to specify the commands which must be issued. For example, in the above table "\s" means a single white space character, "\s+" means one or more spaces, "\s*" means zero or more spaces, "\W" means a non-word character, "\n" means new line, and "\d" means a single digit. The meaning of PERL regular expressions are well known in the art.

Data requests are processed in a fashion similar to those described above, except that the query or sub-query directed to a semi-structured data source is provided to the wrapper generator 614. If the data source 104 to be queried is a semi-structured data source such as a Web page or a flat file containing data, the wrapper generator 614 generates the commands necessary to interact with the data source. If a relational database is accessed over the Web, the wrapper generator 614 passes the request unaltered to a WWW-database gateway. Data requests that either specify multiple data sources 104, or that are directed to multiple data sources 104 by the request translator based on the data requested, may be broken up into sub-queries and optimized in any manner described above.

The wrapper generator 614 uses the specification file declared by each the semi-structured data source 104 in order to access it. The data retriever 620 then extracts the data requested by the data receiver 102 from the semi-structured data source 104 using the specification file. For example, the wrapper generator 614 may issue HTTP commands directly to Web pages, thus mimicking the interaction that would normally take place between a human user and a World Wide Web page. The series of steps required to translate the SQL query of a data receiver 102 into queries to which the data source 104 can respond is declared by each source in its specification file 706.

The specification file 706 is a template for interaction with a data source 104 that results in the retrieval of information requested by the data receiver 102. Not all possible interactions with a Web page, or other types of semi-structured data sources 104, must be modeled in a specification file, since some actions may have no relevance to retrieving data from that particular source 102. The information that is contained in a specification file 706 can be modeled as a directed, acyclic graph, where nodes correspond to particular Web pages, and edges correspond to the HTTP actions that need to take place in order to get to those documents. For example, following a URL link corresponds to an HTTP Get.

A specification file 706 may be created with the aid of software tools, sometimes called "wizards," which simplify the creation of a specification file 706 from the user's standpoint. For example, a wizard may monitor a user's actions and translate those actions into a specification file 706 listing. A user can invoke the wizard when the user is ready to begin accessing a semi-structured data source. Each command or action that the user issues or takes after invoking the wizard would be monitored and recorded by the wizard. The wizard can record the actions or commands in a file which is stored locally in memory on the users computer. Once a user is finished issuing commands to the semi-structured data source, the user deactivates the wizard and the specification file 706 is created.

Referring to FIG. 7, a user who has invoked a wizard to aid creation of a specification file 706 for the Networth site may use an input device to point to the PE_Ratio value as the value desired by the user. The wizard could convert that action by the user into the appropriate line in the specification file 706, i.e. "networth.PE_Ratio P/E\sRatio\</A\>\s+(.*?\s+\<A#)."

Referring again to Table 2, the specification file for a Web page or any other semi-structured data source can be divided into three main sections: general information, a list of transitions, and a list of outputs.

General information is any information related to the data source that does not correspond to states or transitions. For example, the specification file 706 depicted in FIG. 7 and Table 2 includes the name of the site, its Uniform Resource Locator Address, and the capabilities possessed by the site. A specification file 706 may indicate that a particular data source is a database having all of the capabilities a user would expect a relational database to have, i.e. Max, Min, etc. The specification file 706 may indicate that a data source, for example a Web page has more, or very few, of the expected capabilities. In these embodiments the capability information can be used by either the request translator 300 or the wrapper generator 614 to optimize the query. For example, the wrapper generator 614 may break traditional SQL queries down into more basic commands for sites that are "web"-type sites instead of passing the SQL query directly to the site, as it may do for a "database"-type site. Other general information may be included, for example, mean response time, availability, or cost to access the site may be included.

Transition definitions represent changes from one data source state to another. For example, following a link from one Web page to another is a transition. Each transition definition contains the name of the HTTP server that publishes the document for the upcoming state, a retrieval method, a path to the actual document on that server (including CGI query variables) and any conditions that must be specified. For example, referring to Table 2, TRANSITION 1 in the networth specification file shows that the server that publishes the document for the upcoming state is "quotes.galt.com", the retrieval method is by issuing a HTTP Post command, the path to the actual document on that server is "//cgi-bin/stockInt?stock=##networth. Company##&action=0&period=15&periodunit=0 &sectype=0&submit=submit", and that "networth.ticker" is a variable that must be specified before the transition to STATE1 from STATE0 can be made. Each state enumerates all outgoing transitions, for example, STATE0 shows that TRANSITION1 or TRANSITION2 may be used to leave it. The transition actually taken when leaving STATE0 is determined by the input query in a deterministic way.

In some embodiments, the condition information may be used to determine if a query or sub-query may be issued to a semi-structured data source. For example, referring to Table 2, the networth specification file shows that in order to transition to STATE1 from STATE0, "networth.ticker" must be specified by the query. Thus, if a query or sub-query attempts to access the networth semi-structured data source for a data value which must be extracted from STATE 1, and that query or sub-query does not provide "networth.ticker", the requested data value cannot be extracted from the data source because the transition to STATE1 cannot be made.

Figure 8:
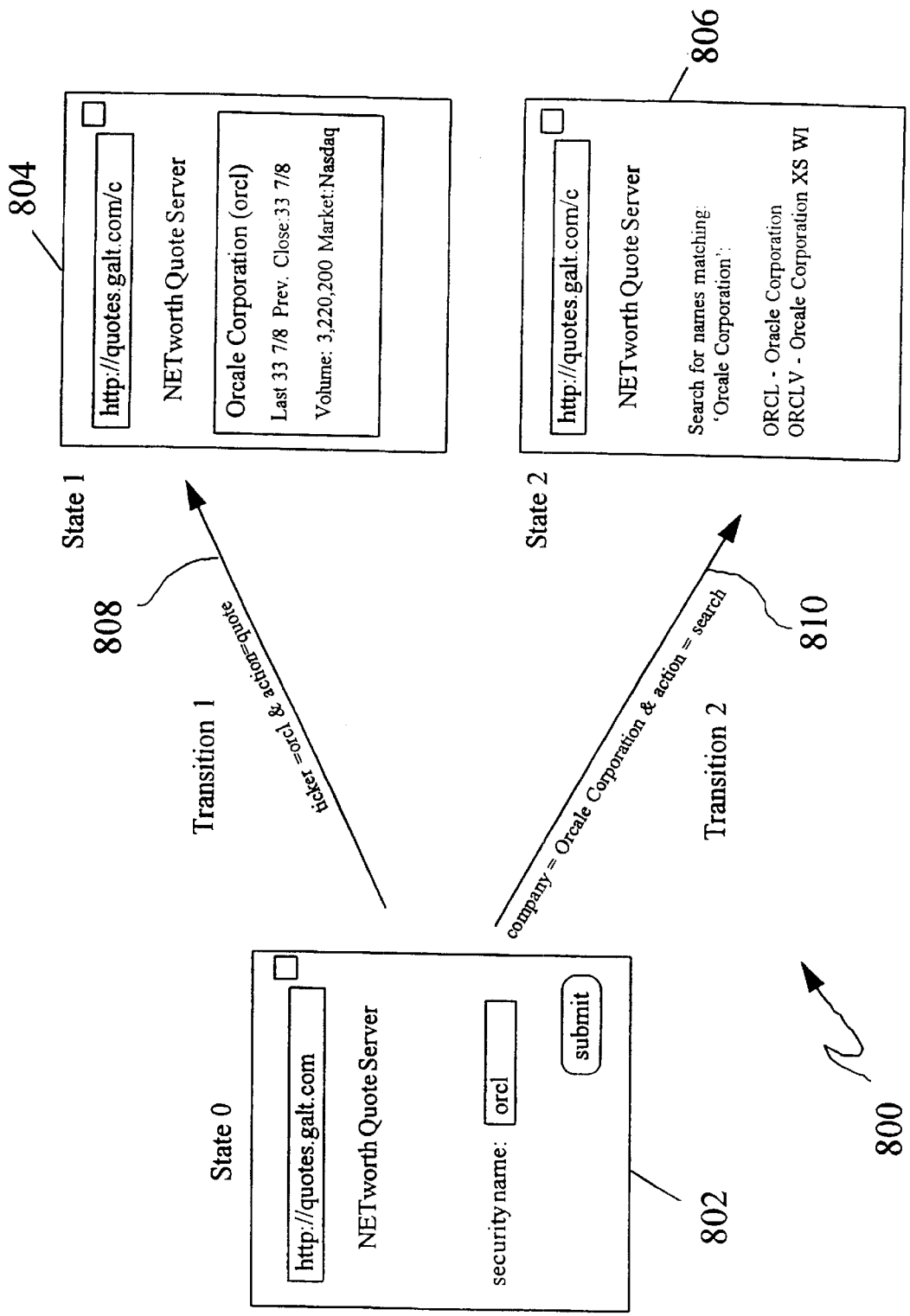
FIG. 8 is a block diagram of a state diagram modeling one embodiment of a specification file.

Referring to FIG. 8, a state diagram 800 for a site called "networth" might correspond to the specification file shown in FIG. 7 and Table 2. The two transitions out of STATE0 correspond to the two possible ways in which the networth server can be queried. The data receiver 102 can specify a ticker symbol to be used during the search or a company name to be used during the search. If the ticker symbol is used during the search, then TRANSITION1 808 is taken from STATE0 802 to STATE1 804. If the company name is used for the search, then TRANSITION2 810 is taken from STATE0 802 to STATE2 806.

For each variable to be retrieved in a given state, the state description contains a pattern to be matched against the document or semi-structured data source 104. For example, TRANSITION1 808 requests a quote from STATE1 804. Referring to Table 2, the specification file indicates that networth.last has a regular expression equal to "Last\</A>\s+(.*?)\s+\<A#". This indicates that the Web page corresponding to STATE1 804 should be searched for the word "Last" and the quote for the appropriate ticker symbol will follow that word. Any text searching method known in the art can be used in place of regular expressions.

Data retrieval from a semi-structured data source 104 proceeds in the manner described above until the data request is satisfied. For example, a data receiver 102 may request the closing stock price for a list of stocks identified by ticker symbol. The series of steps described above would be executed for each ticker symbol and a table of the stocks by ticker symbol and their closing share price would be generated. This table could be generated by the wrapper generator 614 and then passed to the request translator 300 via the data translator 400 to be joined with data from other sources such as relational data bases, or the table could be generated by the request translator 300 itself Queries may access multiple data sources 104 in order to generate the answer for a user query. For example, a query may be broken down into multiple sub-queries, some of which access traditional databases, some of which access relational databases distributed over a network, and some of which access semi-structured data sources such as a Web page or a menu-driven database system. These sites are all accessed as described respectively above and the separate results are returned. The results from the semi-structured data sources distributed over the network are returned to the wrapper generator 614. The separate responses may be joined by the wrapper generator 614 or by the request translator 102 to provide the user with a complete response to the query. Alternatively, different responses to the query may be joined in different locations, e.g. in both the wrapper generator 614 and the request translator 300.

A Web site may also be registered, that is, an export schema 704 and a specification file 706 may be generated for a collection of Web pages that form a site. Alternatively, an export schema 704 and specification file 706 may be generated for a collection of Web pages that provide useful data but are not arranged into a Web site. For example, a user may have knowledge of various disparate Web pages which contain information the user needs to satisfy queries. The user may create a specification file which registers this collection of pages. By registering the collection of Web pages, the user is able to seamlessly access the semi-structured Web pages which directly satisfy all of part of the requests commonly made by the user, even though the user phrases the request in a structured query language.

In some embodiments, the specification file 706 for a Web page is an HTML document having embedded tags that indicate directly to the wrapper generator 614 the states, transitions, and outputs of the data source. For example, a specification file 706 for the networth data source way be a HTML document having additional tags embedded therein which provide the wrapper generator 614 with information about the site. Thus, the wrapper generator 614 could determine directly from a HTML link that the link represents a transition to another state and all of the information described above would conveyed by the additional tags embedded in the HTML link. This mechanism may also be used for data sources which are nearly unstructured. That is, a file containing text that is only delimited, or only tagged, may provide commentary to the wrapper generator 614 which the wrapper generator 614 uses to access the data source properly.

Although the above examples have been given an emphasis on World Wide Web pages, the techniques described above may be used for any semi-structured data source, such as a flat file containing data.

The data contexts 108–118 of a data source 104 and a data receiver 102, or two data sources 104, may be compared using the present invention. Independent from actual data retrieval, this comparison can be used to provide information on the differences, if any, between two contexts and what translations, if any, are necessary to exchange data between the data contexts. The differences or translations may be provided to a user as a file.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. It is preferred that the language used have good text-handling capabilities such as, for example, LISP, PERL, C++, or PROLOG. The software programs may be stored on or in one or more articles of manufacture as object code.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for querying heterogeneous data sources distributed over a network, said system comprising:

a plurality of heterogeneous data sources, each of which includes local information relating to a first semantic data context associated with the heterogeneous data source;

a request translator associated with each requester, said request translator receiving a request having a second semantic data context and comparing said first semantic data context and said second semantic data context to determine if a conflict between those contexts exists, said request translator translating the request, responsive to the conflict determination, into a query having at least one semantic data context associated with at least one of the heterogeneous data sources;

a query converter for converting a portion of the query into at least one command which can be used to interact with a semi-structured data source;

a command transmitter for issuing the at least one command over the network to a semi-structured data source;

a data retriever for extracting data from at least one of the heterogeneous data sources; and a data translator which translates retrieved data from the data contexts associated with the data sources into the data context associated with the request.

2. The system of claim 1 wherein the semi-structured data source is a World Wide Web page.

3. The system of claim 1 wherein the semi-structured data source is a flat file containing data.

4. The system of claim 1 wherein said request translator receives the request.

5. The system of claim 1 wherein said request translator generates the request.

6. The system of claim 1 wherein said request translator determines a heterogeneous data source to query based on the request.

7. The system of claim 6 wherein said request translator determines a heterogeneous data source to query based on an ontology.

8. The system of claim 6 wherein said request translator detects a difference between the context of data requested by the request and the context of data supplied by the data source and converts the data context of the request into the data context of the data source.

9. The system of claim 8 wherein said request translator optimizes the query based on the data context of the data source.

10. The system of claim 1 wherein said query converter converts a portion of the query into at least one command which can be used to interact with a World Wide Web page by accessing a specification file associated with the data source, said specification file providing the commands necessary to access the World Wide Web page containing the requested data.

11. The system of claim 1 wherein said command transmitter optimizes the query by examining a specification file and determining if the commands listed by the specification file can be issued in order to access the World Wide Web page containing the requested data.

12. The system of claim 11 wherein said command transmitter separates the query into a plurality of sub-queries and queries at least one of the heterogeneous data sources using one of the sub-queries.

13. The system of claim 12 wherein the query transmitter queries a World Wide Web page with at least one of the sub-queries.

14. A method for querying semi-structured data sources distributed over a network, said method comprising the steps of:

(a) accessing a plurality of semi-structured data sources to be queried, each of which includes local information relating to a first semantic data context associated with the heterogeneous data source;

(b) receiving a request having a second semantic data context and comparing said first semantic data context and said second semantic data context to determine if a conflict between those contexts exists;

(c) translating the request responsive to the conflict determination into a query having a second data context associated with at least one of the semi-structured data sources to be queried;

(d) converting a portion of the query into at least one command which can be used to interact with a semi-structured data source;

(e) issuing the at least one command to at least one of the semi-structured data sources;

(f) retrieving data from at least one of the semi-structured data sources; and (g) translating retrieved data from the data contexts associated with the semi-structured data sources into the data context associated with the request.

15. The method of claim 14 wherein step (d) further comprises converting a portion of the query into at least one command which can be used to interact with a World Wide Web page.

16. The method of claim 14 wherein step (d) further comprises converting a portion of the query into at least one command which can be used to interact with a flat file containing data.

17. The method of claim 14 wherein step (b) comprises generating a request having a second semantic data context and comparing said first semantic data context and said second semantic data context to determine if a conflict between those contexts exits.

18. The method of claim 14 further comprising the step of determining at least one semi-structured data source to query based on the request.

19. The method of claim 18 wherein said determining step comprises the step of determining at least one semi-structured data source to query based on an ontology.

20. The method of claim 18 further comprising the steps of:

detecting a difference between the context of data requested by the request and the context of data supplied by the data source to be queried; and converting the data context-of the request into the data context of the data source.

21. The method of claim 14 further comprising the step of optimizing the query.

22. The method of claim 14 further comprising the step of querying at least one of the data sources using the translated request.

23. The method of claim 21 wherein said optimization step further comprises:

separating the query into a plurality of sub-queries; and querying at least one of the semi-structured data sources using at least one of sub-queries.

24. The method of claim 23 wherein said querying step further comprises querying a different data source with each one of the sub-queries.

25. A method for querying semi-structured data sources in response to a structured data request, the method comprising the steps of:

(a) converting a data request into one or more commands which can be used to interact with a semi-structured data source;

(b) issuing at least one of the one or more commands to said semi-structured data source; and (c) retrieving data from said semi-structured data source.

26. The method of claim 25 wherein step (a) further comprises converting a data request into one or more commands which can be used to interact with a World Wide Web page.

27. The method of claim 25 wherein step (a) further comprises converting a data request into one or more commands which can be used to interact with a flat file containing data.

28. The method of claim 25 wherein step (a) further comprises:

(a-a) determining if requested data is provided by one or more World Wide Web pages;

(a-b) determining, for each requested datum that is provided by a World Wide Web page, one or more commands which, when issued to the World Wide Web page, cause it to provide the requested datum.

29. The method of claim 28 wherein step (a-a) further comprises determining if requested data is provided by one or more World Wide Web pages by accessing a file stored in a memory element of a computer, said file including a list of all data the one or more World Wide Web page can provide.

30. The method of claim 28 wherein step (a-a) further comprises determining if requested data is provided by one or more World wide Web pages by accessing a file stored in a memory element of a computer, said file containing a list of all data the World Wide Web page can provide and a data context associated with each datum provided by the World Wide Web page.

31. The method of claim 28 wherein step (a-b) further comprises determining, for each requested datum that is provided by a World Wide Web page, one or more commands which cause the World Wide Web page to provide the requested datum, the determination made by accessing a file located in a memory element of a computer which contains at least one instruction to be issued to the World Wide Web page.

32. A system for retrieving data from a semi-structured data source in response to a request, the system comprising:

a plurality of heterogeneous data sources, each of which includes local information relating to a first semantic data context associated with the semi-structured data source;

a request converter for converting a request having an associated second semantic data context into one or more commands which can be used to interact with a semi-structured data source by comparing said first semantic data context and said second semantic data context to determine if a conflict between those contexts exists, said request being converted responsive to the conflict determination;

a command transmitter for issuing at least one of the one or more commands to said semi-structured data source; and a data retriever for extracting data from said semi-structured data source.

33. The system of claim 32 wherein the semi-structured data source is a World Wide Web page.

34. The system of claim 32 wherein the semi-structured data is a flat file containing data.

35. The system of claim 32 wherein said request converter accesses a file contained in a memory element of a computer in order to determine which data can be retrieved from a World Wide Web page and accesses a second file contained in a memory element of a computer which specifies commands to be used to access one of the World Wide Web pages.

36. The system of claim 35 wherein the query converter accesses only one file.

* * * * *